US009680516B2

United States Patent
Brzana et al.

(10) Patent No.: US 9,680,516 B2
(45) Date of Patent: *Jun. 13, 2017

(54) RETAINING ARRANGEMENT FOR A MOBILE COMMUNICATION DEVICE

(71) Applicant: Bury Sp.z.o.o., Mielec (PL)

(72) Inventors: Jacek Brzana, Rowne (PL); Roman Piekarz, Mielec (PL)

(73) Assignee: Bury Sp.z.o.o., Mielic (PL)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,283

(22) Filed: Dec. 9, 2014

(65) Prior Publication Data

US 2015/0119119 A1 Apr. 30, 2015

Related U.S. Application Data

(63) Continuation-in-part of application No. 14/205,451, filed on Mar. 12, 2014.

(30) Foreign Application Priority Data

Mar. 12, 2013 (DE) .................. 10 2013 004 193

(51) Int. Cl.
*H04Q 7/10* (2006.01)
*H04B 1/3877* (2015.01)
*H04M 1/04* (2006.01)

(52) U.S. Cl.
CPC ............ *H04B 1/3877* (2013.01); *H04M 1/04* (2013.01)

(58) Field of Classification Search
CPC .. H04B 1/3888; H04M 1/0283; H04M 1/0202

USPC ................... 455/575.8, 575.4, 575.1
See application file for complete search history.

(56) References Cited

U.S. PATENT DOCUMENTS

| 5,825,874 | A  | * | 10/1998 | Humphreys | ........ B60R 11/0241 |
| | | | | | 379/446 |
| 8,248,812 | B2 | * | 8/2012 | Xiong | ................. H01M 2/1061 |
| | | | | | 361/726 |
| 8,954,117 | B2 | * | 2/2015 | Huang | ................. H04B 1/3883 |
| | | | | | 455/343.6 |

(Continued)

FOREIGN PATENT DOCUMENTS

| DE | 296 23 159 U1 | 3/1998 |
| DE | 203 16 891 U1 | 2/2004 |

(Continued)

*Primary Examiner* — Ajit Patel
*Assistant Examiner* — Julio Perez
(74) *Attorney, Agent, or Firm* — Whitham, Curtis & Cook, P.C.

(57) ABSTRACT

A retaining arrangement for a mobile communication device has an accommodating means which accommodates a mobile communication device. The retaining arrangement includes a retaining setting in which the mobile communication device is retained in the accommodating means, and a release setting which allows the mobile communication device to be inserted into the accommodating means. The retaining arrangement is characterized by a locking means which can be moved into a locking setting and into an unlocking setting, wherein the accommodating means can be moved out of the release setting into the retaining setting only when the locking means is in the unlocking setting.

13 Claims, 6 Drawing Sheets

(56) References Cited

U.S. PATENT DOCUMENTS

| | | | | |
|---|---|---|---|---|
| 2013/0070948 A1* | 3/2013 | Lee | ............ | H04M 1/04 |
| | | | | 381/334 |
| 2013/0244724 A1* | 9/2013 | Monti | ............ | H04M 11/04 |
| | | | | 455/556.1 |
| 2013/0265703 A1* | 10/2013 | Diebel | ............ | H04B 1/3888 |
| | | | | 361/679.01 |

FOREIGN PATENT DOCUMENTS

| DE | 10 2007 012 994.9 B4 | 3/2007 |
|---|---|---|
| DE | 102011100540 A1 | 10/2012 |

* cited by examiner

RETAINING ARRANGEMENT FOR A MOBILE COMMUNICATION DEVICE

CROSS-REFERENCE TO RELATED APPLICATIONS

This application is a continuation-in-part (CIP) application of U.S. patent application Ser. No. 14/205,451 filed on Mar. 12, 2014 and that application has priority to German Application 10 2013 004 193.7 filed Mar. 12, 2013.

FIELD OF THE INVENTION

The invention relates to a retaining arrangement for a mobile communication device, having an accommodating means which is intended for accommodating the mobile communication device and can be moved into a retaining setting, in which the mobile communication device is retained in the accommodating means, and into a release setting, in which the mobile communication device can be inserted into the accommodating means.

BACKGROUND

Mobile communication devices within the context of the present application include, in particular, cell phones, smart phones, PDAs and other devices used for mobile communication.

Such a retaining arrangement is known, for example, from DE 10 2011 100 540 A1. The accommodating means described therein has retaining elements which interact in a form-fitting manner with the mobile communication device, once inserted into the accommodating means, when the accommodating means is located in the retaining setting. It is not possible for the mobile communication device to be removed in this case. If it is intended for the mobile communication device to be removed from the accommodating means or inserted into the same, the accommodating means has to be moved into the release setting, which is distinguished, for example, in that the retaining elements in the release setting are spaced apart from one another by a greater distance than in the retaining setting. In this case, the mobile communication device can easily be removed from the accommodating means.

Such retaining arrangements are often used in motor vehicles in order to arrange the mobile communication device reliably, during travel, in the field of vision of the motor-vehicle driver. It is important here that the operation of inserting the mobile communication device into the accommodating means can take place as straightforwardly as possible, since this is done often just after the commencement of travel and therefore only with a very low level of concentration. The disadvantage is that the mobile communication device cannot be inserted into the accommodating means if the latter has been moved, for example accidentally, out of the release setting into the retaining setting.

The operation of inserting the mobile communication device into the accommodating means is often a habitual movement which can be carried out blind. However, if the accommodating means is located in the retaining setting, it is not possible for the mobile communication device to be inserted, in which case the mobile communication device may end up falling, for example, into the footwell of the motor vehicle in front of the passenger seat. It can move about in an uncontrolled manner there, in which case the mobile communication device may end up being damaged. In addition, the mobile communication device poses a not inconsiderable risk to the motor-vehicle occupants. On the other hand, it could also be the case that the person using the retaining arrangement tries to insert the mobile communication device with excessive force into the accommodating means, even though the latter is located in the retaining setting. As a result, the retaining arrangement, and/or individual retaining elements of the accommodating means, may be damaged.

SUMMARY

It is therefore an object of the invention to develop a retaining arrangement of the generic type further such that the aforementioned disadvantages from the prior art are overcome or at least reduced.

The invention achieves the set object by way of a retaining arrangement of the generic type which is characterized by a locking means which can be moved into a locking setting and into an unlocking setting, wherein the accommodating means can be moved out of the release setting into the retaining setting only when the locking means is located in the unlocking setting, wherein the locking means is arranged, and designed, in such a manner that it is moved into the unlocking setting by a mobile communication device being accommodated in the accommodating means if the mobile communication device is accommodated in the accommodating means in a first orientation, and wherein the locking means is not moved into the unlocking setting by the mobile communication device if the mobile communication device is accommodated in the accommodating means in a second orientation.

This reliably prevents accidental transfer of the accommodating means out of the release setting into the retaining setting. In the case of retaining arrangements from the prior art, all that is required for this purpose is to move for example merely two of the retaining elements toward one another, which can take place, quite possibly, as a result of an accidental movement, or even without being noticed. This is reliably ruled out by a retaining arrangement according to the invention since, in the first instance, the locking means has to be moved into the unlocking setting before the accommodating means can be moved out of the release setting into the retaining setting. The person using a retaining arrangement according to the invention can thus assume that the retaining arrangement is located in the release setting when he wants to insert a mobile communication device into the accommodating means.

In a preferred configuration of the retaining arrangement, the locking means is arranged, and designed, such that it is moved into the unlocking setting by a mobile communication device being accommodated in the accommodating means. This ensures that, during the operation of inserting the mobile communication device into the accommodating means, the locking means is moved into the unlocking setting automatically by the mobile communication device being inserted, in which case the accommodating means can readily be moved out of the release setting into the retaining setting. The operation of inserting the mobile communication device into the accommodating means is thus not made any more difficult or complicated by the locking means which is provided in addition in this configuration, in which case this operation can still be carried out for example while a motor vehicle is being driven.

The locking means is advantageously arranged, and designed, such that it can be moved into the locking setting by virtue of the mobile communication device being removed from the accommodating means. If it is intended, consequently, to remove the mobile communication device from the accommodating means, the accommodating means, in the first instance, is moved out of the retaining setting into the release setting. The mobile communication device can then be removed in a straightforward manner. The locking means here is moved out of the unlocking setting into the locking setting, in which case accidental transfer of the accommodating means out of the release setting into the retaining setting is prevented as long as there is no mobile communication device located in the accommodating means.

The retaining arrangement preferably has at least two retaining elements and the locking means has an actuating element, wherein the actuating element is arranged in or on one of the retaining elements. It is possible for the retaining elements, for example in the retaining setting of the accommodating means, to interact in a form-fitting manner with the mobile communication device once inserted into the accommodating means. The retaining elements here are advantageously in contact with the mobile communication device, in order thus to prevent rattling of the mobile communication device in the accommodating means. It is possible here to use this contact to actuate the actuating element of the locking means and thus to move the locking means into the unlocking setting.

A mobile communication device is therefore inserted into the accommodating means located, for this purpose, in the release setting. It comes into contact here with one of the retaining elements, on which the actuating element of the locking means is located, and thus actuates the actuating element, in which case the locking means is moved out of the locking setting into the unlocking setting. It is thus possible for the accommodating means to be moved out of the release setting into the retaining setting and for the mobile communication device thus to be accommodated reliably in the accommodating means.

In a preferred configuration, the one retaining element on which the actuating element is arranged extends at least over a part of the width of the mobile communication device. It may also extend over the entire width of the mobile communication device. This results, on the one hand, in the mobile communication device being accommodated particularly reliably in the accommodating means and, on the other hand, in a particularly straightforward structural design of the accommodating means and thus in the retaining arrangement.

The actuating element advantageously engages in a socket, preferably a charging socket, of the mobile communication device, and therefore and if cannot be actuated by the mobile communication device if the mobile communication device is accommodated in the second orientation in the accommodating means.

In the event that the mobile communication device is inserted into the accommodating means in a first orientation, the actuating element in this design embodiment is actuated, for example displaced, by the mobile communication device. On account thereof, the locking means is moved into the unlocking setting, such that the accommodating means can be moved from the release setting into the retaining setting. Hereby at least one socket, for example a charging socket of the mobile communication device, may advantageously be brought into engagement with a plug, for example a charging plug, which is provided for this purpose in the retaining arrangement, such that a plug connection between the retaining arrangement and the inserted mobile communication device is created.

In the event that the mobile communication device is inserted into the accommodating means in a second orientation which, for example, is configured so as to be rotated by 180° in relation to the first orientation, the actuating element cannot be actuated by the mobile communication device, since a socket, in particular a charging socket, of the mobile communication device is positioned in the place of the mobile communication device. Displacing the actuating element in the direction of the mobile communication device would consequently result in the actuating element engaging into the socket of the mobile communication device and said actuating element thus not being able to be displaced. Therefore, the locking means cannot be moved into the unlocking setting and thus the accommodating means can also not be moved from the release setting into the retaining setting. This prevents, for example, that the plugs which are provided in the retaining means and which are to be brought into contact with the sockets of the mobile communication device are brought into contact with the mobile communication device and possibly damaged in this faulty position.

As an alternative, or in addition, the locking means has at least one actuating element which is arranged on an abutment surface of the accommodating means. In this case, all that is required is for a mobile communication device which is to be inserted into the accommodating means to be positioned against the abutment surface of the accommodating means, in order to actuate the actuating element of the locking means. There is therefore no need to bring the mobile communication device into contact with one of the retaining elements, thus requiring considerably more precise orientation of the mobile communication device relative to the accommodating means of the retaining arrangement.

The locking means advantageously has at least one catch element, which can be moved into a locking position, in which the locking means is located in the locking setting, and into an unlocking position, in which the locking means is located in the unlocking setting. The catch element is advantageously one which is mounted such that it can be pivoted about a pivot axis and which can be pivoted about the pivot axis in order to move the locking means out of the locking setting into the unlocking setting, or vice versa. It is possible for the catch element to be of, for example, essentially L-shaped design and to have two limbs running at an angle to one another. The pivot axis here is located, for example, in the region between the two limbs. In this particularly straightforward configuration, one of the limbs may form the actuating element which pivots the catch element about the pivot axis. This also results in the second limb of the catch element being moved, said second limb allowing, for example, movement of a retaining element as long as the catch element has been pivoted.

The locking means can thus be moved out of the locking setting into the unlocking setting, and vice versa. This can, of course, take place more than once in the desired direction. This ensures that the retaining arrangement can be used repeatedly.

The catch element is advantageously prestressed into the locking position by at least one spring element. One possible configuration provides, for example, for the catch element to have an actuating element which reacts to pressure. If the actuating element is subjected to pressure, the catch element is pivoted about a pivot axis and thus moved into an unlocking setting. This pressure can be applied, for example, by a mobile communication device being inserted into the accommodating means. As long as the actuating element is subjected to the pressure by the mobile communication device, the catch element remains in the unlocking setting, in which case the accommodating means can be moved out of the release setting into the retaining setting. Of course, the reverse is also possible here, in which case, for the purpose of removing the mobile communication device from the accommodating means, it is also possible for the accommodating means to be moved out of the retaining setting into the release setting. If the mobile communication device is removed, it is no longer possible for the actuating element to be subjected to any pressure, in which case the catch element, following the spring force of the spring element, moves out of the unlocking setting into the locking setting.

The accommodating means advantageously has dimensions which can be adjusted to a length, a width and/or thickness of the mobile communication device. This means that the retaining arrangement can be used in flexible fashion for different types of mobile communication device, possibly from different manufacturers. It has been found to be particularly advantageous here if it is also possible to adjust the position of the locking means relative to the accommodating means. It is often the case that connection elements, for example sockets, or actuating elements, for example switches, are provided, for example, on side surfaces of the mobile communication devices. These connection elements, however, are arranged at different locations on different mobile communication devices. In order to prevent the situation where one of these operating or interface elements are covered by the locking means, and therefore rendered inaccessible to the user, it is possible for the locking means to be designed such that it can be displaced relative to the accommodating means and thus also relative to a mobile communication device once inserted into the accommodating means.

The retaining arrangement is preferably distinguished by a displaceable covering, which covers at least one plug-connector element, in particular a compact plug-in connection, as long as there is no mobile communication device located in the accommodating means. Plug-in connections are necessary in order, for example, to allow data connection between the retaining arrangement and the mobile communication device, once inserted, or to charge up the rechargeable battery of the mobile communication device. In particular data plug-in connections, which may be designed, for example, as USB, mini USB or other compact plug-in connections, are often of intricate design and can therefore withstand mechanical loading only to a very poor extent, if at all. Such mechanical loading may be caused, for example, by a mobile communication device being inserted incorrectly. The plug-in connection is therefore covered preferably by the displaceable covering, which is displaced, during the operation of inserting the mobile communication device, so as to achieve a plug-in connection between the plug-connector element and the mobile communication device.

It is also possible for the displaceable covering to subject the mobile communication device to a force which makes it easier for the mobile communication device to be removed from the accommodating means of the retaining arrangement. For better is positioning and at least temporary securing/fastening, it is also possible to provide, for example in addition to a contact plug-in connector, a resiliently mounted ball element that engages, for example, in a depression provided on the mobile communication device. This ensures guidance during the operation of inserting the mobile communication device into the accommodating means, in which case incorrect insertion is made more difficult or even rendered impossible.

In addition, a mobile communication device is thereby already retained in the accommodating means which is still in the release setting.

DESCRIPTION OF THE DRAWINGS

An exemplary embodiment of the present invention will be explained in more detail hereinbelow with the aid of a drawing, in which.

DETAILED DESCRIPTION

Figure 1:
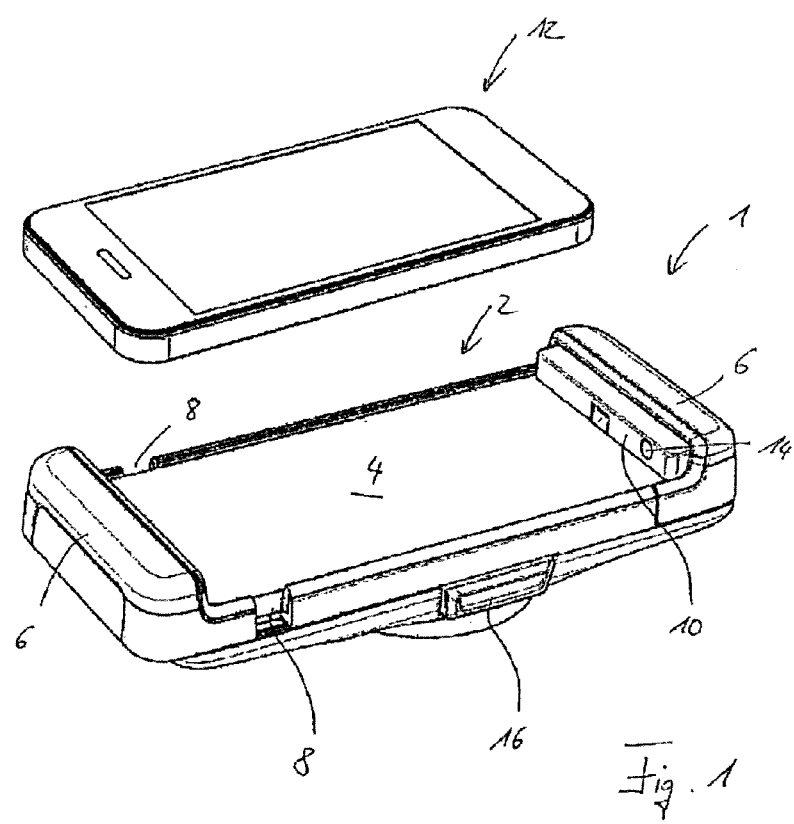
FIG. 1 shows a retaining arrangement according to a first exemplary embodiment of the present invention.

FIG. 1 shows a retaining arrangement 1 having an accommodating means 2. This has an abutment surface 4 and two retaining elements 6. In the exemplary embodiment shown in FIG. 1, the accommodating means 2 is located in the release setting. It can be seen that the left-hand retaining element 6 has been displaced to the left relative to the abutment surface 4. This gives rise to two gaps 8, in which case the two retaining elements 6 are spaced apart from one another by a greater distance than in the pushed-together state, that is to say in the retaining setting.

A displaceable covering 10 is located in the right-hand retaining element 6 and can be displaced parallel to the abutment surface 4. Illustrated above the retaining arrangement 1 is a mobile communication device 12 that can be inserted into the retaining arrangement 1. Connection sockets are located on a side surface of the mobile communication device 12 and interact with plug-in connections provided for this purpose on the right-hand retaining element 6. The displaceable covering 10 is provided in order to protect these intricate and sensitive plug-in connections and compact plug connectors, and said covering covers, and protects, all the plug-in connections in the state which is shown in FIG. 1. If, then, the mobile communication device 12 is positioned on the abutment surface 4 and the accommodating means is moved from the release setting (shown) into the retaining setting, by the two retaining elements 6 being moved toward one another, the displaceable covering 10 is displaced, in which case the mobile communication device 12 can interact with the plug-in connections (not shown). In the exemplary embodiment shown, a resiliently mounted ball element 14 interacts with an audio jack of the mobile communication device 12. An operating element 16 is illustrated on the side surface of the retaining arrangement 1. Actuation of said operating element 16, which is designed in the form of a button, frees a locking mechanism in the interior of the retaining arrangement 1, in which case the accommodating means 2 is moved out of the retaining setting into the release setting (shown). The operating element 16 is thus operated in order to remove a mobile communication device 12 from the accommodating means 2.

Figure 2:
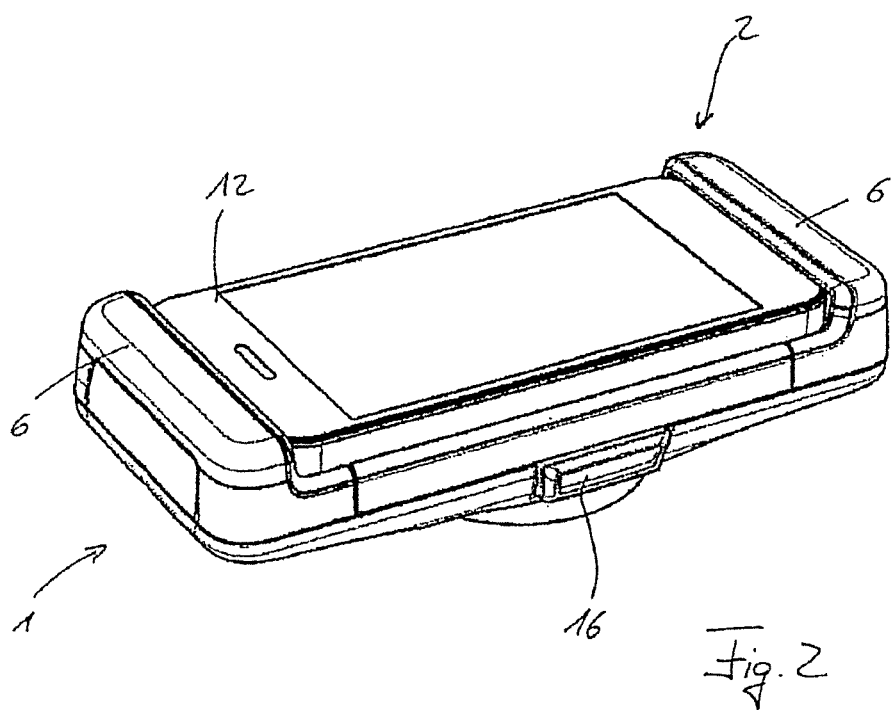
FIG. 2 shows the retaining arrangement from FIG. 1 with a mobile communication device inserted.

FIG. 2 shows the retaining arrangement 1 with the mobile communication device 12 arranged therein. It can be seen that the two retaining elements 6 have been moved toward one another, in which case the two gaps 8 illustrated in FIG. 1 are no longer present in FIG. 2. The accommodating means 2 is thus located in the retaining setting, in which the two retaining elements 6 interact, in the exemplary embodiment shown, in a form-fitting manner with the mobile communication device 12. It is not possible for the mobile communication device, in this position, to be removed from the accommodating means 2.

The displaceable covering 10 has been pushed into the right-hand retaining element 6 to expose plug-in connections provided there, it then being possible for said plug-in connections to interact with the mobile communication device 12. Should the mobile communication device 12 be removed from the accommodating means 2, all that is required is for the operating element 16 to be actuated, in which case the two retaining elements 6 are displaced in relation to one another and assume a position in which they are at a greater distance apart from one another. As a result, the accommodating means 2 is moved out of the retaining setting (shown) into the release setting.

Figure 3:
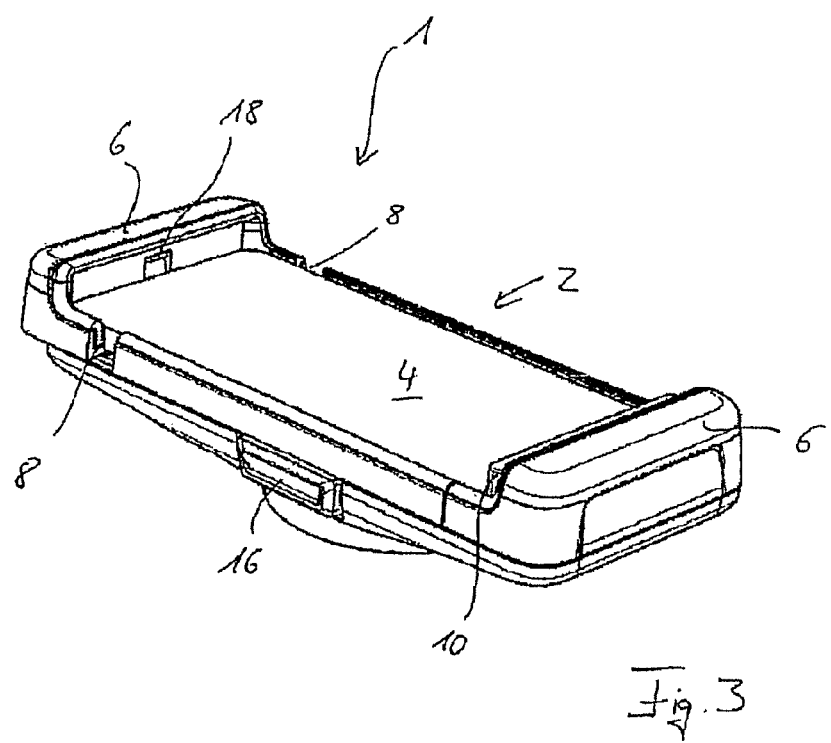
FIG. 3 shows a retaining arrangement according to an exemplary embodiment of the present invention.

FIG. 3 shows the retaining arrangement from FIGS. 1 and 2 with the accommodating means 2 in the release setting. FIG. 3, then, shows a different perspective, in which case it is now possible to see the interior of the left-hand retaining element 6. An actuating element 18, which belongs to a locking means (not shown), is illustrated therein. If a mobile communication device 12 is inserted into the accommodating means 2, the mobile communication device 12 pushes against the actuating element 18 and moves the locking means out of the locking setting (shown) into the unlocking setting. It is only then that the accommodating means 2, by virtue of the two retaining elements 6 being pushed together, can be moved into the retaining setting. This is not possible in the state which is shown in FIG. 3.

Figure 4:
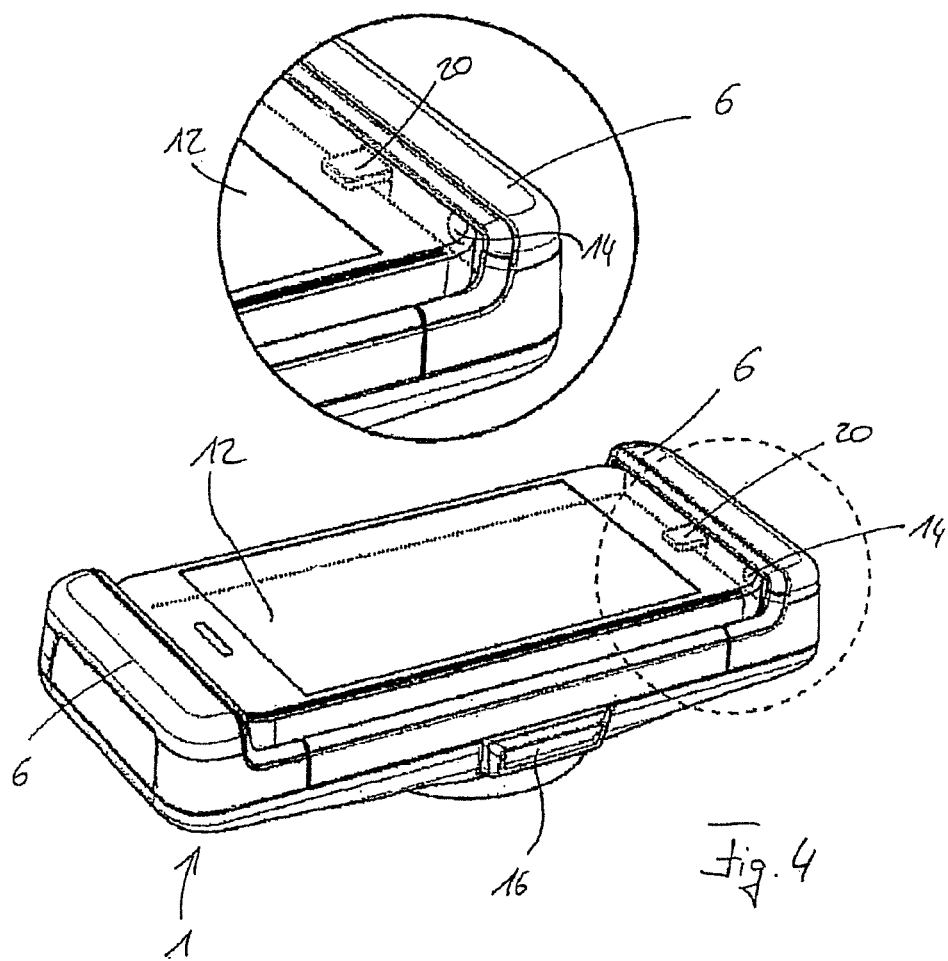
FIG. 4 shows a retaining arrangement with a mobile communication device inserted and also an enlarged detail-type view.

FIG. 4 shows the illustration from FIG. 2 of the retaining arrangement 1 with the mobile communication device 12 inserted. The circular insert in FIG. 4 illustrates, on an enlarged scale, the detail illustrated by the dashed-line circle. The components which cannot be seen in the illustration shown have been illustrated by chain-dotted lines. It can be seen that the right-hand retaining element 6 contains a compact plug-in connection 20, which may be designed, for example, as a USB or mini USB connection. Of course, all other plug-in connections for which the mobile communication device 12 is equipped are also conceivable. Also illustrated is the resiliently mounted ball element 14, which interacts with the audio jack of the mobile communication device 12. The displaceable covering 10 has not been illustrated, since it has been pushed into the right-hand retaining element 6.

Figure 5:
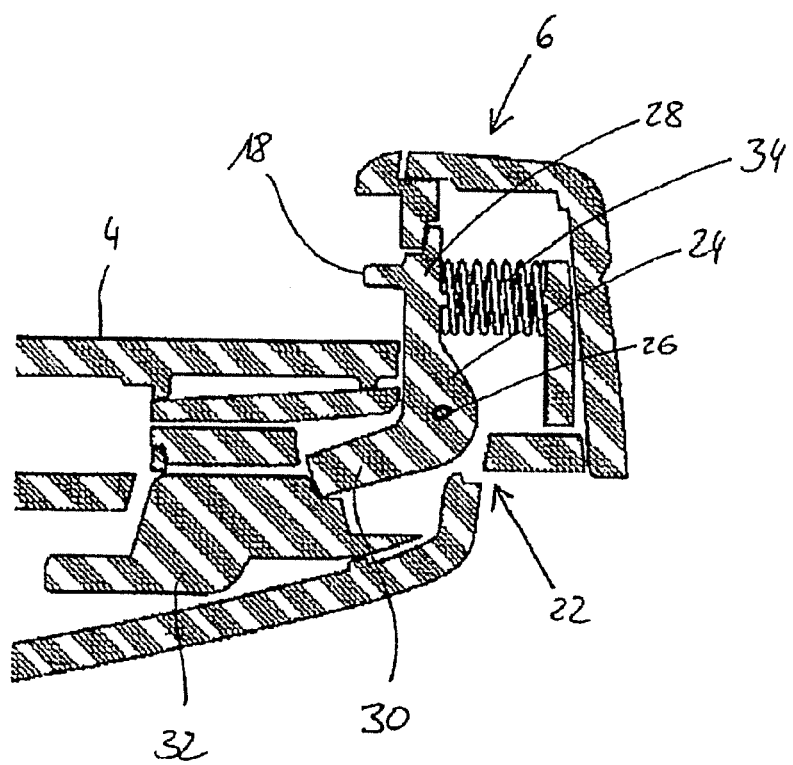
FIG. 5 shows the schematic sectional illustration through part of a retaining arrangement according to an exemplary embodiment of the present invention.
Figure 6:
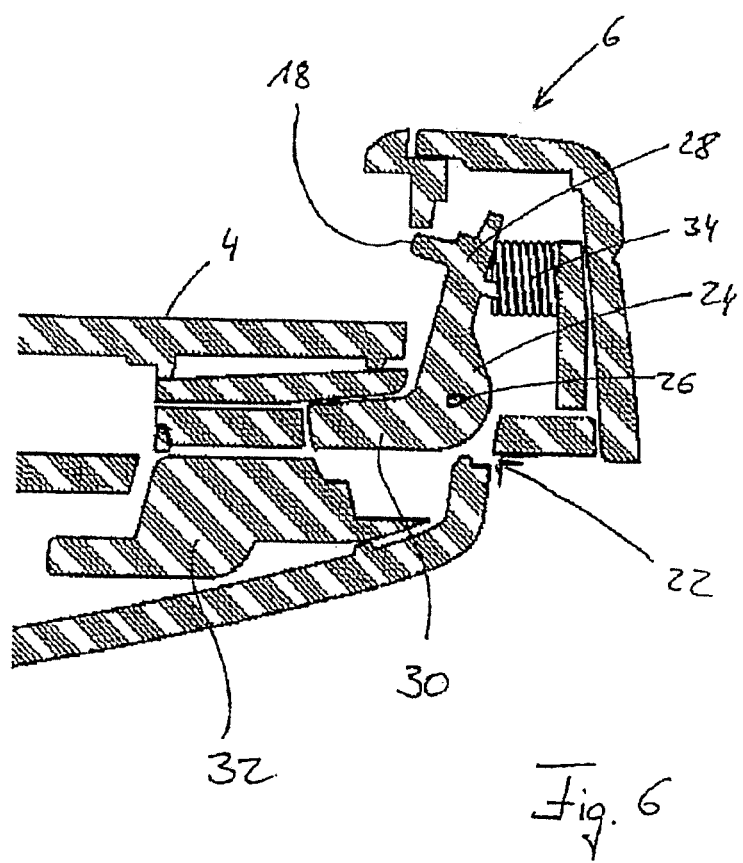
FIG. 6 shows a further schematic sectional illustration through part of a retaining arrangement.

FIGS. 5 and 6 show a schematic sectional illustration through part of the retaining arrangement 1. Each figure illustrates a section through a retaining element 6. It is also possible to see the abutment surface 4 of the accommodating means 2. The actuating element 18, which belongs to a locking means 22, is located in the retaining element 6. FIG. 5 shows the locking means 22 in the locking setting. The actuating element 18 is part of a catch element 24, which can be pivoted about a pivot axis 26 running perpendicularly to the plane of the drawing. The actuating element 18 is arranged on the first limb 28. In the locking setting, which is shown in FIG. 5, a second limb 30 butts against a stop element 32, which is fixed relative to the abutment surface 4. In the locking setting, which is shown in FIG. 5, displacement of the retaining element 6 to the left is not possible on account of the second limb 30 stopping against the stop element 32. Consequently, it is not possible for the accommodating means 2 to be moved from the release setting into the retaining setting.

If, in contrast, the actuating element 18 is subjected to a force to the right, the catch element 24 is pivoted about the pivot axis 26 counter to the force of a spring element 34.

This situation is illustrated in FIG. 6. It can be seen that the catch element 24 has been pivoted about the pivot axis 26, since the actuating element 18 has been subjected to a force to the right. The latter has pivoted the catch element 24 counter to the force applied by the spring element 34, in which case the second limb 30 of the catch element 24 no longer butts against the stop element 32. The component which is now located in front of the second limb 30 is connected to the retaining element 6 and is thus displaced when the retaining element 6 is displaced. This then allows the retaining element 6 to be displaced and therefore the accommodating means 2 to be moved from the release setting into the retaining setting.

In the exemplary embodiment shown, a mobile communication device 12 which has been inserted into the accommodating means 2 subjects the actuating element 18 to the applicable force as long as it is located in the accommodating means 2. If the mobile communication device is removed, the actuating element 18 is no longer subjected to the force and the spring element 34 ensures that the catch element 24 is pivoted about the pivot axis 26 again, in which case it resumes the position illustrated in FIG. 5, that is to say, therefore, the locking setting.

LIST OF DESIGNATIONS

1 Retaining arrangement
2 Accommodating means
4 Abutment surface
6 Retaining element
8 Gap
10 Covering
12 Mobile communication device
14 Ball element
16 Operating element
18 Actuating element
20 Compact plug-in connection
22 Locking means
24 Catch element
26 Pivot axis
28 First limb
30 Second limb
32 Stop element
34 Spring element

The invention claimed is:

1. Retaining arrangement for a mobile communication device, comprising:
   an accommodating means for accommodating the mobile communication device and which can be moved
     into a retaining setting, in which the mobile communication device is retained in the accommodating means, and
     into a release setting, in which the mobile communication device can be inserted into the accommodating means;
   a locking means which can be moved into a locking setting and into an unlocking setting, wherein the accommodating means can be moved out of the release setting into the retaining setting when the locking means is located in the unlocking setting and wherein the accommodating means cannot be moved out of the release setting into the retaining setting when the locking means is located in the locking setting, wherein the locking means is arranged, and designed, in such a manner that it is moved into the unlocking setting by a mobile communication device being accommodated in the accommodating means if the mobile communication device is accommodated in the accommodating means in a first orientation, and wherein the locking means is not moved into the unlocking setting by the mobile communication device if the mobile communication device is accommodated in the accommodating means in a second orientation, and wherein the accommodating means comprises two retaining elements and wherein the locking means comprises a catch element which comprises a first limb and a second libm and which can be pivoted about a pivot axis, wherein the actuating element is arranged on the first limb and the second limb abuts against a stop element when the locking means is in the locking setting thereby preventing a displacement of the retaining element.

2. Retaining arrangement according to claim 1, wherein the locking means is arranged, and designed, such that it can be moved out of the unlocking setting into the locking setting by virtue of the mobile communication device being removed from the accommodating means.

3. Retaining arrangement according to claim 1, further comprising at least two retaining elements, and wherein the locking means has an actuating element which is arranged on one of the at least two retaining elements.

4. Retaining arrangement according to claim 3, wherein the one retaining element on which the actuating element is arranged extends at least over a part of the width of the mobile communication device.

5. Retaining arrangement according to claim 3, wherein the actuating element engages in a socket of the mobile communication device, and therefore is not actuated by the mobile communication device if the mobile communication device is accommodated in the accommodating means in the second orientation.

6. Retaining arrangement according to claim 5 wherein the socket is a charging socket.

7. Retaining arrangement according to claim 1, wherein the locking means has at least one actuating element which is arranged on an abutment surface of the accommodating means.

8. Retaining arrangement according to claim 1, wherein the locking means has at least one catch element, which can be moved into a locking position, in which the locking means is located in the locking setting, and into an unlocking position, in which the locking means is located in the unlocking setting.

9. Retaining arrangement according to claim 8, wherein the at least one catch element is prestressed into the locking position by at least one spring element.

10. Retaining arrangement according to claim 1, wherein the accommodating means has dimensions which can be adjusted to a length, a width and/or a thickness of the mobile communication device.

11. Retaining arrangement according to claim 1, wherein a position of the locking means is adjustable relative to the accommodating means.

12. Retaining arrangement according to claim 1, further comprising a displaceable covering which covers at least one plug-connector element as long as there is no mobile communication device located in the accommodating means.

13. Retaining arrangement according to claim 12, wherein the at least one plug-connector element is a compact plug-in connection.

* * * * *